J. Bruce,
Motor.

N° 36,506.   Patented Sep. 23, 1862.

Witnesses;
James H. Shelley
Charles Smith

Inventor,
John Bruce

J. Bruce,
Motor.

2 Sheets, Sheet 2.

N°. 36,506. Patented Sep. 23, 1862.

Witnesses,
John H. Mead
John Stewart

Inventor,
John Bruce

UNITED STATES PATENT OFFICE.

JOHN BRUCE, OF BROOKLYN, NEW YORK.

MOTIVE POWER.

Specification of Letters Patent No. 36,506, dated September 23, 1862.

*To all whom it may concern:*

Be it known that I, JOHN BRUCE, of Brooklyn, in the county of Kings and State of New York, have invented certain new and useful Improvements in Lever Motive Powers; and I do hereby declare the following to be a full and exact description of the same, reference being had to the accompanying drawings, making part of this specification, in which—

Figure 1:
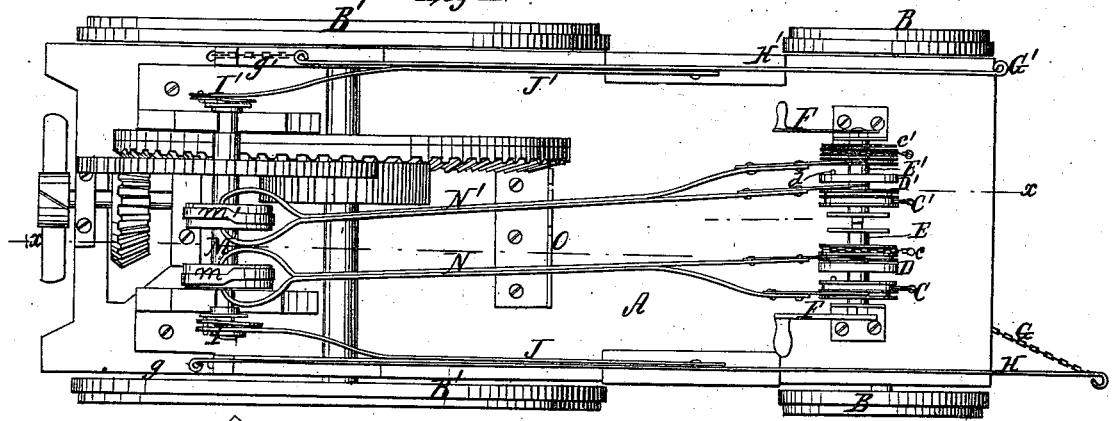
Figure 2:
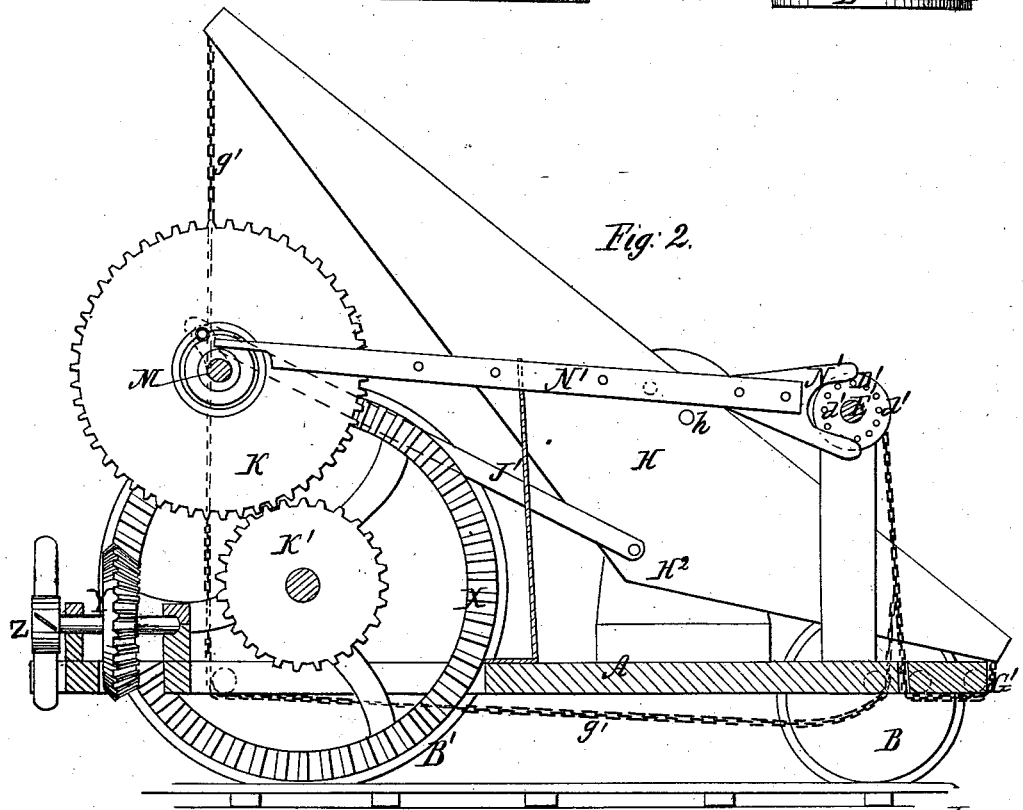
Figure 3:
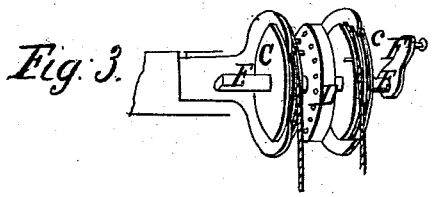
Figure 4:
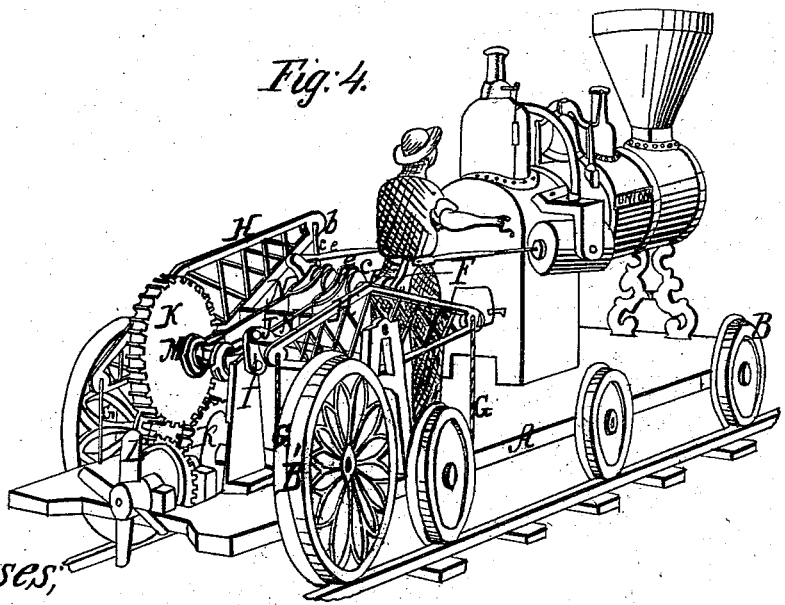

Figure 1 is a top view of an apparatus illustrating my invention. Fig. 2 is a vertical section of the same at $x$ $x$ Fig. 1. Fig. 3 is a perspective view of the clutch gearing hereinafter described. Fig. 4 is a perspective view illustrating the manner of applying my invention to turn the driving wheels of a locomotive.

Similar letters of reference indicate corresponding parts in all the figures.

The subject of my invention is a combination of mechanical devices employed to communicate continuous or reciprocating motion at any desired speed from a continuously rotating shaft. For this purpose I employ upon the continuously-rotating shaft, one or more fixed coupling flanges each having a loose pulley upon each side of it which pulleys being alternately coupled to the shaft by an automatic clutch are caused to draw the alternate ends of one or more levers by means of which the motion is transmitted to cranks, as will be hereinafter explained.

To enable others skilled in the art to which my invention appertains to fully understand and use the same, I will proceed to describe its construction and operation.

A is the bed of a carriage supported upon wheels, B B', the latter being drivers.

E E' are shafts rotated by cranks F, and carrying flanges D D', which are provided with pins or perforations, $d$, to adapt them to clutch and rotate grooved pulleys C $c$ C' $c'$, hung loosely upon the shafts E, when the said pulleys are thrown into contact with the flanges D D'. The throwing of the pulleys in and out of gear is effected by means of horizontal levers N N', fulcrumed in a standard O, and actuated by cam-wheels $m$ $m'$, upon a secondary shaft M.

G $g$ G' $g'$ are chains or cords passing around the pulleys C $c$ C' $c'$ and attached to the respective ends of levers H H', which are fulcrumed at $h$ to suitable standards in the main frame of the carriage.

$H^2$ represent arms projecting downward from the levers H.

J J' are connecting-rods extending from the arms $H^2$ to cranks I I' upon the shaft M. The said shaft also carries a cog-wheel, K, which gears with a corresponding wheel, K', upon the shaft of the driving-wheels B'.

Operation: The crank shafts E E', are rotated continuously in either direction. The pulleys C C', being first in gear with the flanges D, will receive rotation therefrom, and winding up the cords G G', will draw down the front ends of the levers H H' throwing forward the projecting arms $H^2$, and thereby rotating the driving-wheels B' through the medium of connecting-rods J J', cranks I I', and gearing K K'. At the instant the crank I' reaches the extremity of its stroke, the cam-wheel $m'$ moves the lever N' so as to throw the pulley C' out and the pulley $c'$ into contact and gear with the flange D', so that the continued rotation of the shaft E, winds up the cord or chain $g'$ upon the pulley $c'$ thereby drawing down the rear end of the lever H' and reversing the motion of the crank I' while the pulley C' turning loosely upon the shaft E, permits the free unwinding of the cord G', as required by the rising of the front end of the lever H, which was previously depressed. The crank I remains effective long enough to carry the crank I' completely past its dead-point, and the latter in turn becomes effective in its reverse motion in time to carry over the crank I. As the crank I reaches the extremity of its stroke its motion is reversed by means of the clutch gearing $m$ N C $c$ D, in the same manner as already explained in reference to the crank I', and thus the driving wheels B' are continuously moved.

X Y are multiplying bevel-gears, by means of which a screw, Z, or other object, may be driven at a high velocity by the mechanism above described.

I do not desire to restrict myself to the precise dimensions, form, or arrangement of the various parts in my apparatus as above described. It will be apparent that the same may be varied and the invention applied to various uses without departing from its essential principles.

Having thus described my invention, what I claim as new therein and desire to secure by Letters Patent, is:—

1. The loose pulleys C $c$ C' $c'$, thrown automatically into and out of gear with the flanges, D D', upon the shafts, E E', so as to receive intermittent motion by the continuous rotation of the said shafts as explained.

2. The combination of the shafts, E, clutch gearing, m N C c D, cords or chains, G G', and lever H, operating substantially as and for the purposes specified.

JOHN BRUCE.

Witnesses:
M. M. LIVINGSTON,
L. F. COHEN.